Patented Oct. 23, 1934

1,978,071

UNITED STATES PATENT OFFICE 1,978,071

NITROCELLULOSE COMPOSITION AND PROCESS OF PREPARING SAME

Albert Foster York, Washington, D. C., assignor to S. Sternau & Co., Inc., New York, N. Y., a corporation of New York No Drawing. Application February 29, 193' Serial No. 595,969

4 Claims. (Cl. 52—20)

This invention relates to nitrocellulose compositions such as explosives and processes of producing the same.

During the process of manufacture of explosives, plastics, and many other materials it is necessary that the nitrocellulose be "colloided", a term used in the art to designate a treatment with solvents to remove structure and convert the nitrocellulose into an amorphous integral body. The solvents may be used in a quantity sufficient to make a solution or in an amount merely sufficient to plasticize.

This invention is based on a scientific discovery made by the applicant that methyl alcohol is a better solvent for nitrocellulose at low temperatures than at high temperatures, that is, there is an inverted temperature solubility phenomenon. A highly nitrated nitrocellulose which is to all practical purposes incapable of being colloided by methyl alcohol at room temperature and above is colloided at sub-zero temperatures. The lower nitrated nitrocelluloses (10–12.5% $N_2$) which can be colloided by methyl alcohol at room temperatures can be colloided much more readily and with less alcohol at sub-zero temperatures. The same holds true for ethyl alcohol although it is not as good a colloiding agent at a given temperature, as is methyl alcohol. On the other hand, propyl, butyl and the higher aliphatic monohydroxy alcohols and pure ethyl ether showed no evidence of colloiding any type of nitrocellulose at room temperatures down to that obtained with solid carbon dioxide.

The application to the manufacture of smokeless powder of the methods of colloiding nitrocellulose in methyl and ethyl alcohol gives many advantages over the prior art. The elimination of ether or acetone simplifies the process of manufacturing and lessens a fire and explosion hazard due to these materials. The substitution of methyl alcohol for the ether or acetone remaining in the final product improves the product in that there is a reduced tendency toward carbon deposition due to the reduction in the proportion of the carbon to oxygen. This holds true, but to a lesser degree where the ether or acetone is only partially replaced by alcohol i. e. where methyl alcohol-ether, methyl alcohol-acetone, are used in the low temperature process. Other solvents and liquids mixable in alcohol may be used. Other advantages of the process will become apparent on reading the specification.

It is in the use of methyl alcohol, however, that the most important advantages are obtained. Throughout the following description the term methyl alcohol will be used but it is to be understood that ethyl alcohol, although it may not give as satisfactory results, may be used. Methyl alcohol is to be considered as distinct from ethyl alcohol and not equivalent.

Methyl alcohol has other advantages over ethyl alcohol in addition to its superior colloiding ability. The lower boiling point is of advantage in evaporation and drying. The fact that it does not form a constant boiling mix with water as does ethyl alcohol is of advantage in solvent recovery and reuse of the alcohol. It burns with a flame which has less unburned carbon than any known solvent used in the manufacture of these explosives. Furthermore, the development of synthetic processes has made available large quantities of inexpensive pure anhydrous methyl alcohol or synthetic methanol. The expense, purity and water free state of the solvent used in the manufacture of smokeless powder is of great importance.

The steps in the manufacture of my smokeless powder are dehydrating, cooling, colloiding, forming and drying.

The dehydration of water-wet nitrocellulose as done by prior methods at present is to displace the water with 95% ethyl alcohol. In my low temperature process the procedure is to displace the water with methyl alcohol recovering the methyl alcohol from the resulting aqueous methyl alcohol in a simple distillation. However, if ethyl alcohol is to be used as the colloiding agent the 95% ethyl alcohol followed by anhydrous ethyl alcohol is used in order to displace the water and obtain an alcohol wet nitrocellulose.

After dehydration of the nitrocellulose comes the colloiding stage. In the low temperature process a typical procedure is as follows: Methyl alcohol wet nitrocellulose is subjected in a closed apparatus to a temperature of around −20° C. At low concentrations of nitrocellulose in methyl alcohol colloiding results of itself, at medium concentrations mixing by kneading is advisable, while at very high concentrations i. e. where the amount of alcohol is just about sufficient only to wet the nitrocellulose, viz. 70% nitrocellulose, 30% alcohol, it is advisable to use pressure to bring about colloiding. All, or part of the pressure may be obtained by allowing the cold mass to warm and expand against retaining means. This is an important step possible only in the low temperature process. Also the first compression may be supplemented by mixing and recompression. After the colloiding process the material is pressed or formed by dies into grains of the required size and shape. All of the stages may be carried out in the cold or some at room temperature, but it is advisable that at least part of the pressure is exerted on the cold mixture. The formed material is dried to a given dimension, the finished material having only a slight solvent content.

Another method is as follows: A substantially water free mixture of nitrocellulose and methyl alcohol in about the proportion of 1:1, is subjected to low temperatures of about $-30°$ C. The temperatures used may vary, the best colloiding action with a given amount of solvent being obtained at low temperatures such as $-90°$ C. The cold mixture is then kneaded and thoroughly mixed so as to bring about good colloiding of the nitrocellulose by the methyl alcohol. The mass is then run through rollers which transform it into thin homogeneous and transparent sheets. The sheets can easily be cut into strips in a cutting machine and these sheets further cut into square leaflets or flakes. Instead of using rollers, the kneaded mass may be run into a pressing machine, the mouth of which is so formed that the sheets come out as strips of the proper width, and these may be cut into squares. The rolling or pressing operations may be carried out wholly or partially on the cold mass or sol. If the sol is allowed to rise to room temperatures it sets to a gel. This gel mass may also be rolled or pressed and in this operation part of the solvent may be squeezed out and separated. However, in all events, a final drying stage is necessary for the last few per cent of methyl alcohol is removed with extreme difficulty and cannot be completely removed.

It is to be understood that not only may methyl alcohol be used in the low temperature colloiding but also there may be used anhydrous ethyl alcohol, methyl alcohol-ethyl alcohol, and mixtures with methyl alcohol and/or ethyl alcohol of ether and/or acetone and other common solvents. It is also to be understood that materials commonly used in the manufacture of smokeless powder such as diphenyl amine may be mixed with the alcohol.

It is to be further understood that the temperatures used may vary from low enough to freeze the solvents to temperatures slightly below room temperature. Since the colloiding ability of methyl alcohol and ethyl alcohol increases with decreasing temperature in order to use as little alcohol as possible it is advisable to colloid at sub-zero temperatures. However, some colloiding is possible at slightly below room temperature and results may be obtained at such temperatures especially if ether or acetone is used with the alcohols. In general low temperatures obtained by an ammonia refrigeration are satisfactory although carbon dioxide refrigeration to obtain very low temperatures is practical and advantageous.

It is to be understood that this invention is not limited to the specific examples given. Various combinations and rearrangements of the steps in the processes are apparent. The various processes, such as the expansion process, may be used to produce fuels, plastics, and many other products as well as explosives.

Not only may solid and liquid materials be incorporated in my alcohol nitrocellulose sols but also gases such as hydrogen, oxygen hydrocarbons as ethylene, propylene, methane, propane, explosive mixtures, and poisonous gases such as carbon monoxide, chlorine, phosgene.

A procedure for the incorporation of gases is as follows: 5% weight nitrocellulose of 12.5% $N_2$ content in methyl alcohol is cooled to $-15°$ C. Gases are then absorbed in the sol at this temperature. Many of the hydrocarbon gases are liquids at low temperatures and are soluble in alcohol so that they may be simply mixed with the cold sol. After incorporating the gases at the low temperature the sols are allowed to rise in temperature, and the sol held at some raised temperature, beyond which temperatures the gases will not remain absorbed. By holding the sols at a given temperature higher than the lowest temperature used to produce colloiding, the sol will set to a gel and hold the absorbed gases, and when the gel is raised to room temperature where further gellation takes place the absorbed gases will be held under pressure in a gel. On ignition the gel burns with a spurting long flame. For details of my ordinary solidified fuel see the patent to Jones and York 1,934,860.

My copending application Serial Number 595,233 is drawn to substantially similar processes, but is not limited to insoluble nitrocellulose.

What I claim is:—

1. The process of producing a nitrocellulose composition which comprises subjecting nitrocellulose and an aliphatic monohydroxy alcohol of less than three carbon atoms to a sub-zero centigrade temperature, and allowing the cold mixture to increase in temperature and compress itself against retaining means.

2. The process of producing a nitrocellulose composition which comprises subjecting nitrocellulose and an aliphatic monohydroxy alcohol of less than three carbon atoms to a sub-zero centigrade temperature to produce a sol, dispersing a gas in the cold sol, and allowing the mixture to rise in temperature and gel so as to retain the gas in the gel under pressure.

3. The process of producing a nitrocellulose composition which comprises subjecting nitrocellulose and methyl alcohol to a temperature below 20° C., and allowing the cold mixture to increase in temperature and compress itself against retaining means.

4. The process of producing a nitrocellulose explosive composition which comprises subjecting nitrocellulose and ethyl alcohol to a sub-zero centigrade temperature, and allowing the cold mixture to increase in temperature and compress itself against retaining means.

ALBERT FOSTER YORK.